United States Patent [19]

Turner

[11] Patent Number: 4,825,329

[45] Date of Patent: Apr. 25, 1989

[54] EARTH LEAKAGE CIRCUIT BREAKER WITH PLUG ACTUATED RESETTING BREAKER

[75] Inventor: Colin Turner, The Old Vicarage, United Kingdom

[73] Assignee: Flymo Limited, Darlington, United Kingdom

[21] Appl. No.: 90,891

[22] Filed: Aug. 31, 1987

[30] Foreign Application Priority Data

Aug. 29, 1986 [GB] United Kingdom ............... 8620902
Mar. 27, 1987 [GB] United Kingdom ............... 8707439

[51] Int. Cl.⁴ ............................................. H02H 3/08
[52] U.S. Cl. .................................... 361/93; 361/45; 335/18; 335/27
[58] Field of Search ........................ 361/42–50, 361/93; 335/18, 26, 27

[56] References Cited

U.S. PATENT DOCUMENTS

| | | | |
|---|---|---|---|
| 1,740,911 | 12/1929 | Todd, Jr. .................... | 335/27 |
| 2,157,787 | 5/1939 | Farrell ....................... | 335/27 |
| 4,409,574 | 10/1983 | Misencik et al. ............ | 335/18 |
| 4,521,824 | 6/1985 | Morris et al. ............... | 361/45 |
| 4,568,997 | 2/1986 | Bienwald et al. ........... | 335/18 X |
| 4,595,894 | 6/1986 | Doyle et al. ................ | 361/42 X |
| 4,630,015 | 12/1986 | Gernhardt et al. .......... | 335/18 |

*Primary Examiner*—A. D. Pellinen
*Assistant Examiner*—A. Jonathan Wysocki
*Attorney, Agent, or Firm*—Alfred E. Miller

[57] ABSTRACT

An earth leakage circuit breaker has a socket for connecting an appliance to be protected. A plug inserted in the socket depresses a plunger (34), tilting a cam (38) which acts through a striker (42) to momentarily close a relay, thus resetting the circuit breaker. When the appliance is unplugged the cam returns to its normal position, by-passing the striker (42) but closing a pair of test contacts. The reset and test functions are thus carried out without the need for separate buttons, and at times the load is disconnected, so that the circuit breaker contacts do not break load current when they open or close during resetting or testing.

4 Claims, 7 Drawing Sheets

INITIAL POSITION. [PLUG OUT]

RESET ACTUATOR CLOSING CONTACTS.

TEST ACTUATOR CLOSING CONTACTS.

RESET RL1 TO OFF CONDITION.

RESET ACTUATOR CLEAR OF STOP.

RL1 TO ON CONDITION.

PHASE PINS OF PLUG CONNECTED.

PLUG FULLY IN.

INITIAL POSITION (PLUG OUT.)

PIP   PC                POP

RESET ACTUATOR CLOSING CONTACTS.

TEST ACTUATOR CLOSING CONTACTS.

RL1 FAILS TO RESET TO 'OFF' CONDITION.

CAM LOCKED BY RESET ACTUATORS.

EARTH LEAKAGE CIRCUIT BREAKER WITH PLUG ACTUATED RESETTING BREAKER

BACKGROUND OF THE INVENTION

This invention relates to an electrical safety device of the kind commonly known as a ground fault circuit interrupter residual current device or earth leakage circuit breaker (ELCB), which latter term will be used herein.

An earth leakage circuit breaker generally makes use of a relay with two-pole normally-open contacts. A holding circuit maintains the relay closed so long as voltage appears at the output of the device, and a sensor arranged to sense an unbalance in current disables the holding circuit and causes the relay to open on the occurrence of any leakage current to earth. Resetting means must be provided to close the relay after it has opened, or when the circuit is first switched on, and some means for testing the device is necessary to ensure that it remains operative and sufficiently sensitive to trip under fault conditions. These functions are normally provided by means of a reset button and a test button on the casing of the device. It will be noted that in the conventional earth leakage circuit breaker the contacts will usually make or break the full load current when they close on resetting or open on testing.

SUMMARY OF THE INVENTION

The present invention provides an earth leakage circuit breaker in which the resetting and test functions are performed automatically on plugging in or unplugging the appliance to be protected. This obviates the need for test and reset buttons, and also ensures that the testing and resetting are carried out when no load current is being drawn, thereby lengthening the life of the relay contacts, or allowing contacts of lower rating to be used.

In a more elaborate version of the breaker of the invention, insertion of the plug may first re-set the breaker, then initiate a test trip, and then reset the breaker only if the initial test trip has been successful.

BRIEF FIGURE DESCRIPTION

The invention will now be described by way of example with reference to the accompanying drawings, in which.

Figure 7A:
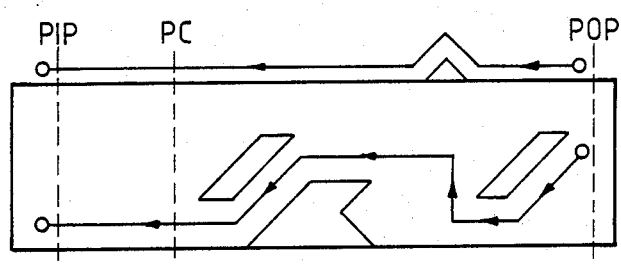
Figure 7B:
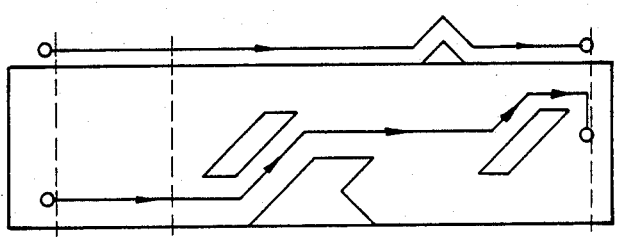
Figure 7C:
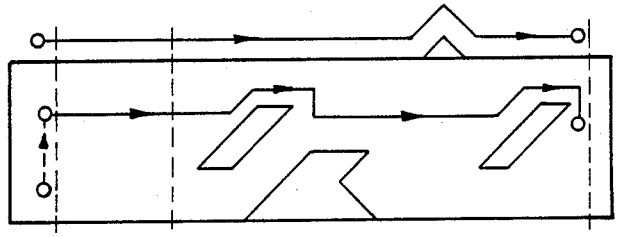
Figure 8A:
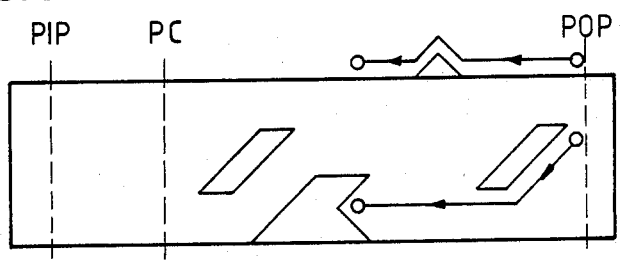

FIG. 5A-H show the positions of cam actuators at a number of positions of the cam with the circuit breaker functioning correctly;

FIGS. 6A-E show the positions of the cam actuators for a number of cam positions in the case in which a relay RL1 fails to trip during an initial test sequence, resulting in the cam preventing the relay from re-setting;

FIG. 7A shows the paths of the actuators on normal operation plug insertion;

FIG. 7B shows the paths of the actuators on plug removal without a trip occuring in operation;

FIG. 7C shows the paths of the actuators on plug removal when a trip has occured;

FIG. 8A shows the paths of the actuators on plug insertion with fault; and

Figure 8B:
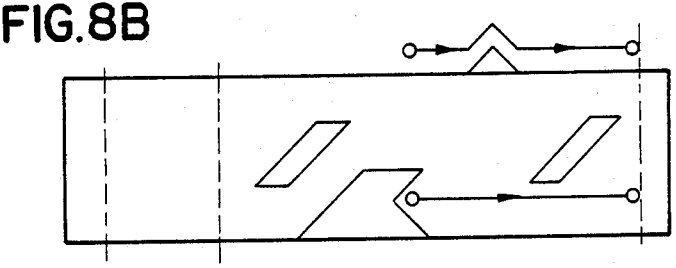

FIG. 8B shows the paths of the actuators on plug removal after fault.

DETAILED DISCLOSURE OF THE INVENTION

Figure 1:
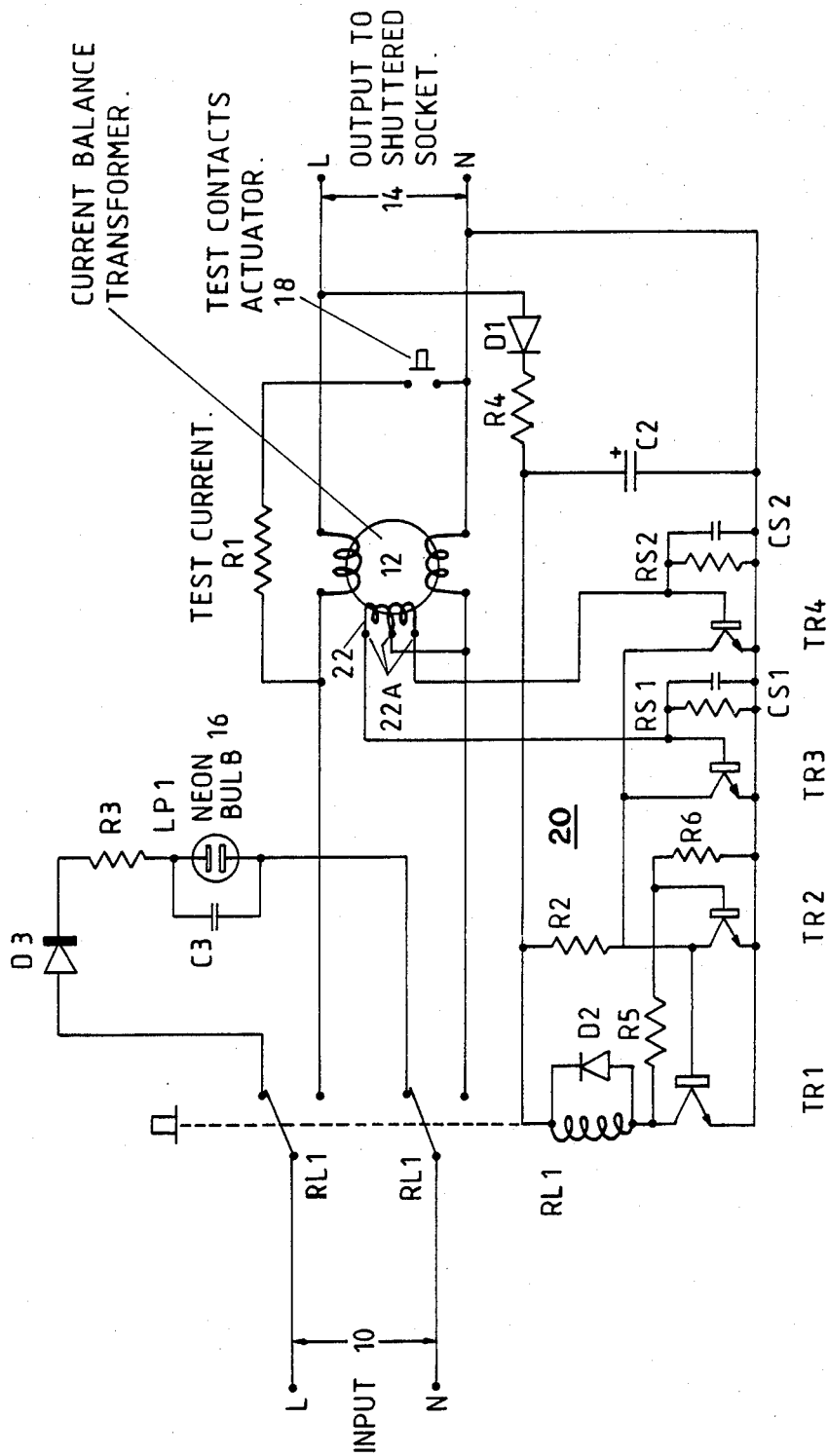
FIG. 1 is a circuit diagram showing one form of circuit suitable for use in the invention.

Referring to FIG. 1, a pair of input terminals 10 are provided for connection to the supply and these in turn are connected through the normally-open contacts of a changeover relay RL1 to a current balance transformer device 12 for detecting a current imbalance representing the existence of an earth leakage path. The device 12 consists of a toroidal core wound with a pair of equal and symmetrical windings connected in opposite senses, so that on flow of current through them the magnetic fields induced in the toroidal core cancel out. A sensor winding 22 detects any residual field produced by the currents becoming unbalanced, as will be described below. Output leads 14 from the device 12 are taken to the terminals of a shuttered socket, as will be described in more detail with reference to Figrues 2 and 3. A flashing neon indicator bulb 16 is connected across the N.C. contacts and serves to indicate when the output contacts of the relay RL1 are open, and power is not being supplied to the protected appliances.

A test contact 18 in series with a current-limiting resistor R1 is connected between the neutral lead on the output side of the device 12 and the live lead on the input side and, when closed, causes an unbalance in the currents through the toroid device 12. The magnitude of the unbalance current is determined by the current limiting resistor R1 and when the earth leakage circuit breaker is functioning correctly should be sufficient to cause it to trip.

A DC holding circuit for the relay RL1 comprises a diode D1, and a storage condenser C2 fed from the leads 14 through the resistor R4. When the output contacts of the relay RL1 are closed this circuit produces sufficient current to hold the relay in its closed condition.

The transistors TR1 and TR2 form a bistable circuit using RL1, R2, R5 and R6 where TR1 will be "ON" from application of a voltage across the capacitor C2.

A trip circuit 20 serves to trip the device when an unbalance is detected by the device 12. The sensor winding 22 of the toroid 12 is connected to the terminals 22A of the trip circuit and any current induced in this winding is applied between the bases of transistors TR3 and TR4, whereupon one transistor becomes conductive and removes TR1 base current generated through a resistor R2. This removes the holding current through the winding of the relay RL1, allowing the relay to open. Resistors RS1 and RS2 ensure that the sensor winding 22 of the device 12 presents a sufficient impedance to the imbalance current to enable it to produce sufficient voltage to switch TR3 or TR4.

Components D3, R3, C3 and neon lamp LP1 form a relaxation oscillator causing LP1 to flash when voltage is applied to the normally closed contacts of RL1.

The trip circuit 20, therefore, causes the earth leakage circuit breaker to open whenever an unbalance is detected, whether it is caused by a defective appliance connected to the terminals 14, or by the closure of the test contacts 18.

Figure 2:
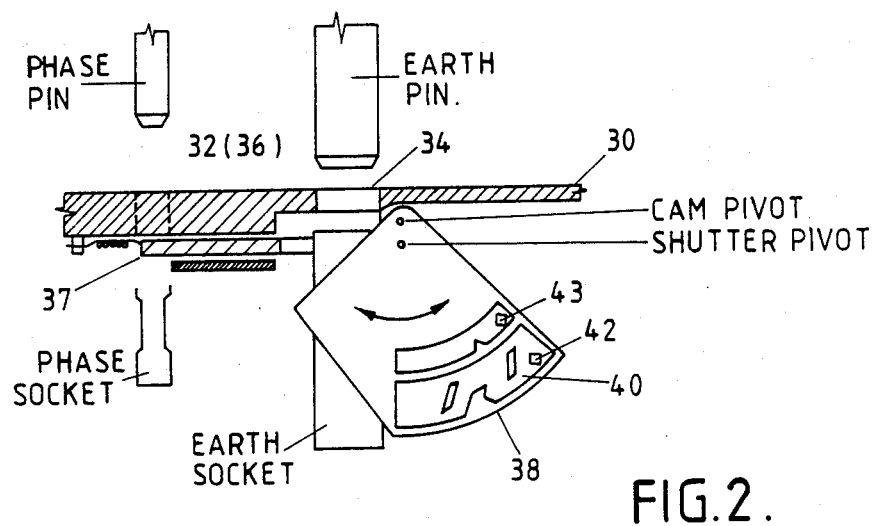
FIG. 2 is a diagrammatic section through a device according to the invention.
Figure 3:
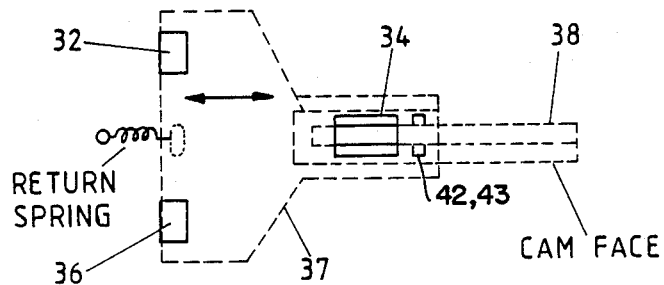
FIG. 3 is a plan view of FIG. 2, without the plug body, view toward the socket surface.

FIGS. 2 and 3 show very diagrammatically in section and plan the mechanical arrangements of the socket part of the earth leakage circuit breaker of the invention. The casing 30 carries a standard plug socket, the apertures of which are indicated at 32 and 36, and a plunger 34. Behind the apertures there is located a cam 38 of insulating material which is angularly displaceable through an angle of a about 40°, displacement being effected by the plunger 34, when this plunger is depressed by inserting a plug into the socket. The lower part of the cam 38 carries a cam section or face 40. The cam section or face 40 engages cam followers provided at the lower end of the cam 38.

Referring again to FIG. 1, it will be seen that the momentary closure of the relay contacts 1 energises the hold circuit of the relay, charging the capacitor C2 by means of the diode D1, and thereby maintaining the contacts in their closed position. Since the plunger 34 operates the cam 38 before the plug pins engage the supply contact, the relay contacts are closed before any current can flow in the load circuit.

The test contacts 18 are positioned above the shutter cam 38 in such a position that they are closed by the uppermost portion of the cam section 40 when the plug is inserted. The test contacts thus close only after the load has been disconnected. Closure of the test contacts 18 unbalances the current through the toroid device 12 and cause the sensor winding to apply a current to the trip circuit 20, allowing the relay to open, as has already been described with reference to FIG. 1.

From the foregoing description, it will be appreciated that the earth leakage circuit breaker is first tested and then reset as the plug of the appliance to be protected is inserted into its socket, and when the plug is fully inserted the indicator bulb 16 stops flashing. When the plug is removed, the indicator bulb should start to flash, indicating that the earth leakage circuit breaker is tripping or has tripped in response to a test condition. Failure of the bulb to flash when the appliance is unplugged indicates that the breaker is not functioning correctly. The indicator bulb 16 may if desired, be replaced by an audible warning device such as a buzzer.

Should the earth leakage circuit breaker trip in operation, it is reset merely by unplugging the appliance, correcting any fault that may have caused it to trip, and then plugging it in again, the act of plugging in resetting the breaker. The fact that the appliance must be unplugged in order to reset the breaker is an additional safety feature of an earth leakage circuit breaker according to the invention.

Although a plunger has been employed in the above embodiment of the invention, one of the pins of the plug might act directly on a suitably shaped part of the cam. Further, the cam need not be in the form of hinged plate; it could, for example, be a spring-loaded sliding rod or a disc bearing suitable cam surfaces.

Figure 4:
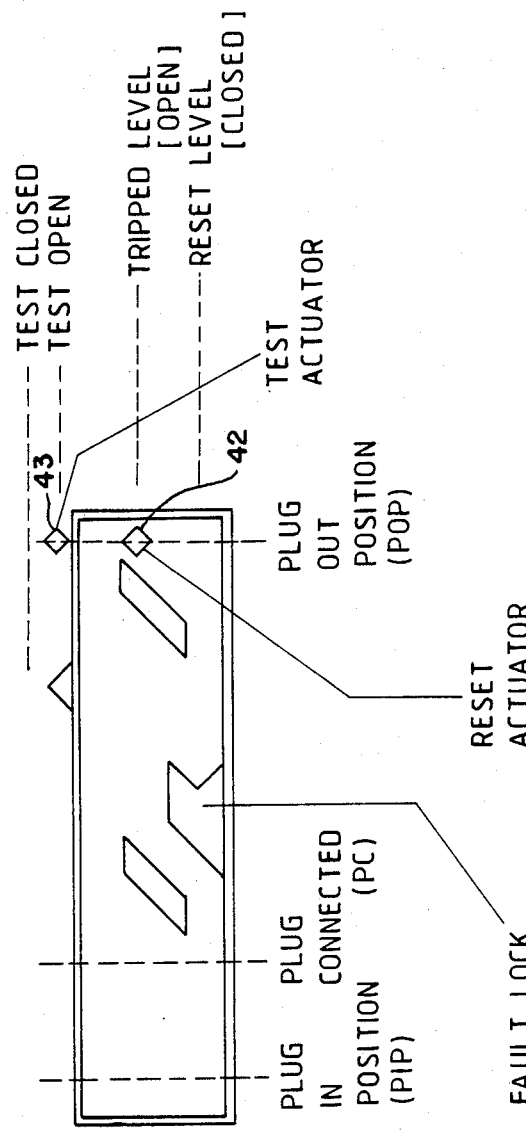
FIG. 4 shows a linear representation of the cam 38.

As illustrated in FIGS. 2 and 4, the test actuator 43 and the reset actuator 42 are arranged to cooperate with the cam surfaces of the cam 38. The test actuator is arranged to actuate the test button 18 by any conventional means, to effect the closing of the contacts of the test actuator when the test actuator is moved to its upper position, to cause an unbalance in the circuit of FIG. 1, thereby to effect the tripping of the circuit breaker. When the test actuator is in its lower position, the test contact actuator contacts are open. The reset actuator 42 is arranged by any conventional means to control the reset button 42A (FIG. 1), so that the relay contacts are mechanically moved to reset position when the actuator 42 is moved to its lower position.

Figure 5A:
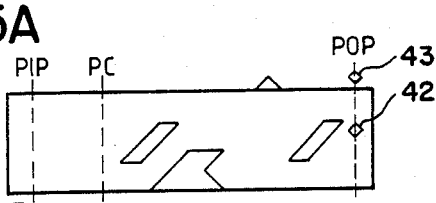
Figure 5B:
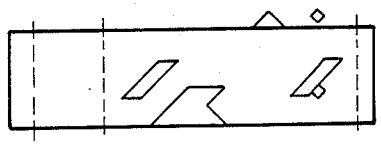
Figure 5C:
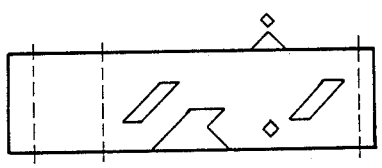
Figure 5D:
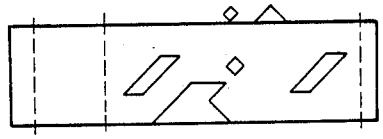
Figure 5E:
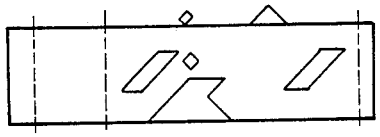
Figure 5F:
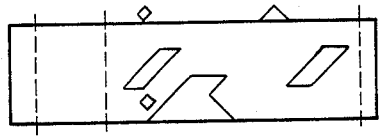
Figure 5G:
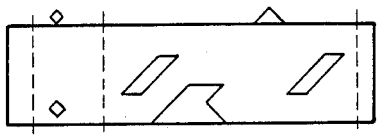
Figure 5H:
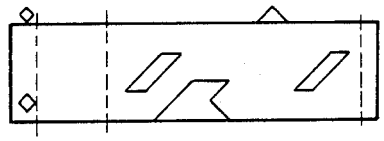

FIGS. 5A-5H sequentially show positions of the cam and actuators as the plug is inserted in the socket. Thus, in FIG. 5A, with the plug out, the actuators are positioned with the test contacts open and the breaker tripped. As shown in FIG. 5B, the breaker is first reset, and then, in FIG. 5C, the test contacts closed to trip the breaker. This results in the tripping of the breaker, as shown in FIGS. 5D and 5E. Upon further insertion of the plug, as shown in FIG. 5F, the breaker is again reset. FIGS. 5G and 5H shown the last phases of the plug insertion.

Figure 6A:
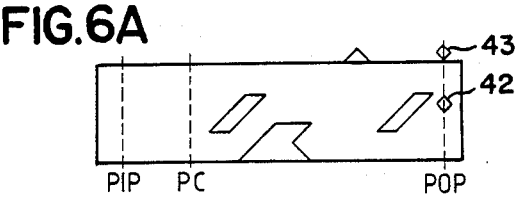
Figure 6B:
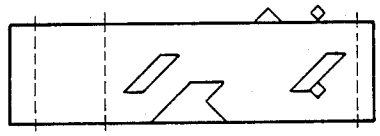
Figure 6C:
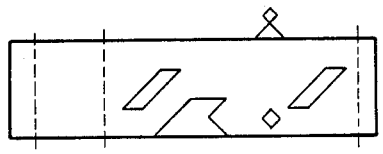
Figure 6D:
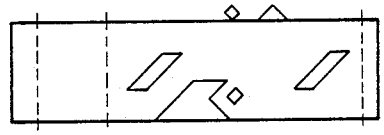
Figure 6E:
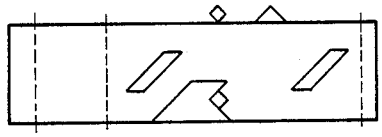

FIGS. 6A-6E show the effect if the relay fails to trip during an initial test. FIGS. 6A-6C are the same as FIGS. 5A-5C. In FIG. 6D, the relay has not returned to the off condition. As a consequence, the reset actuator 42 locks in a cam surface, in FIG. 6E, to prevent further insertion of the plug.

FIGS. 7A-7C and 8A-8B show the paths of the actuators as the plug is being inserted and removed, in order to clearly show the operation thereof in a different manner.

I claim:

1. An earth leakage circuit breaker comprising an output socket having terminals which receives electric power and being adapted to receive a plug for an appliance, whereby the plug has first, second, third and fourth successive positions in said socket upon being inserted in the socket and the socket comprises means for applying electric power to said plug only in said fourth position, said circuit breaker comprising a normally-open relay having contacts arranged to interrupt the supply of power to said terminals, a hold circuit for the relay, means for tripping the relay on occurrence of an unbalance current, test contacts connected to produce an unbalance current in said circuit breaker when said test contacts are closed, means responsive to said unbalance current for tripping the relay, first means responsive to the insertion of a plug into the socket to said first position for energizing the relay, second means responsive to the insertion of the plug into the socket to said second position for closing the test contacts to produce an unbalance current for tripping the relay, third means responsive to the insertion of said plug to said third position for opening said test contacts, whereby said relay remains tripped at said third position if an unbalance current is present when said test contacts are open, and fourth means for inhibiting movement of said plug from said third position to said fourth position if an unbalance current is present in said breaker.

2. An earth leakage circuit breaker according to claim 1 wherein said second means comprises a cam section positioned to close said test contacts at said second position of said plug upon insertion and/or removal of the plug.

3. An earth leakage circuit breaker according to claim 2 comprising a plunger mounted to move said cam section, said plunger being positioned to be displaced on insertion of the plug.

4. An earth leakage circuit breaker according to claim 2 wherein the first means comprises a reset actuator for closing said relay and a first cam surface mounted to cooperate with said reset actuator, the first cam surface being shaped to reset the relay upon insertion of the plug, and wherein said fourth means comprises a second cam surface positioned to inhibit further insertion of the plug should the relay fail to trip at said third position of said plug.

* * * * *